Sept. 3, 1935.  W. H. SCHMITT  2,013,526
NUT LOCK WASHER
Filed Nov. 3, 1930   2 Sheets-Sheet 1

Inventor
William H. Schmitt
By (signature)
Attorney

Sept. 3, 1935.  W. H. SCHMITT  2,013,526
NUT LOCK WASHER
Filed Nov. 3, 1930    2 Sheets-Sheet 2

Inventor
William H. Schmitt

By Thomas Rieker
Attorney

Patented Sept. 3, 1935

2,013,526

UNITED STATES PATENT OFFICE 2,013,526

NUT LOCK WASHER

William H. Schmitt, St. Paul, Minn.

Application November 3, 1930, Serial No. 493,020

5 Claims. (Cl. 151—52)

My invention relates to a nut lock and washer having a nature to lock the nut on a thread in a simple and effective manner.

The nut lock includes a washer having spring fingers which engage either with the corners of the nut when the same is turned over the spring fingers, so that the corners of the nut may be engaged by the end of the spring fingers carried by the washer, or the spring fingers engage in suitable notches formed under one side of the nut to hold the nut against turning backward or unthreading off of the thread when the nut is screwed down on a thread against the locking washer.

The nut may be of ordinary plain structure in use with my locking washer in one form of the construction, while in other forms the washer may vary to provide spring fingers projecting on either side of the same where two nuts are used one against the other, or where a single nut is used the spring fingers will project from the same side of the washer. Where the locking means is designed to engage in a notch formed in the nut, it is desirable to form these notches on the inner face of the nut and an annular shoulder may be provided extending about the threaded opening through the nut so as to form a bearing surface against which the nut may be turned while the notches are adjacent thereto on the same face that the annular shoulder projects from.

It is possible to accomplish the locking of the nut by a washer having upwardly projecting spring fingers which engage on the flat side walls of the nut and spring over the same as the nut is screwed home, and in each case it is desirable to have the washer provided with a shoulder or projection which engages against a flat side on the threaded bolt on which the nut is to be attached or within a milled recess extending longitudinally of the threaded member or bolt.

I will endeavor to point out the objects and details more fully throughout the specification and claims.

In the drawings forming part of this specification:

Figure 1:
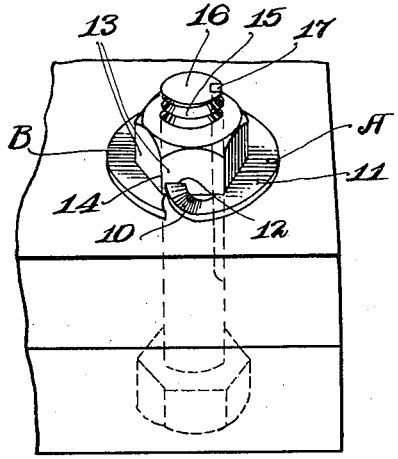
Figure 1 illustrates a manner in which my nut lock washer may be employed to hold a nut locked in place.

The drawings illustrate my nut lock washer A which is formed with arcuated spring fingers 10 stamped from the body 11 of the washer A which are adapted to be of a formation so as to provide a shoulder end 12 which engages against the side wall 13 of the nut B adjacent the corner 14 of the nut.

Figure 2:
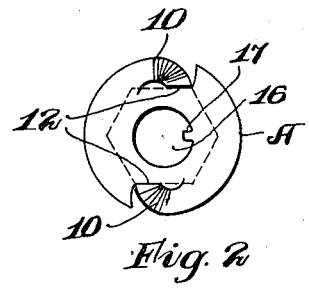
Figure 2 is an end view of the structure illustrated in Figure 1, looking at the threaded end of the bolt.

The washer A is provided with two spring fingers 10 as illustrated in Figure 2, so as to engage the nut B on opposite sides by the shoulder ends 12. The lock washer A is formed of spring material and as the nut is screwed home on the thread 15 of the bolt 16, the ends 12 engage the side walls 13 of the nut B and prevent the same from turning back off of the thread.

Figure 3:
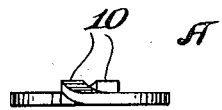
Figure 3 is a side elevation of the nut lock washer used in Figures 1 and 2.
Figure 4:
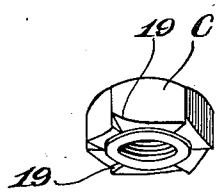
Figure 4 is a perspective of the form of nut where the notches are used on the inner face of the nut and where the annular bearing shoulder is provided for the same.
Figure 5:
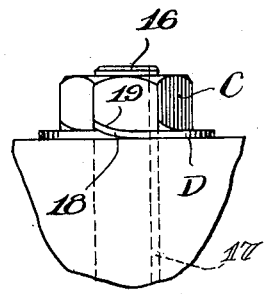
Figure 5 is a side view of the nut where the notches are used on the inner face and which may or may not be provided with the annular shoulder structure.

The washer A is provided with a lug 16 which engages in the longitudinal or milled recess 17 formed in the bolt 16. This holds the washer A from turning and permits the corners 14 of the nut to ride over the spring fingers 10. The washer A is illustrated in side elevation in Figure 3, showing the spring fingers as they would appear projecting upwardly from one face of the same.

Figure 8:
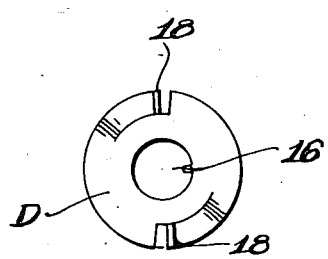
Figure 8 illustrates a plan view of the lock washer used in Figure 5.
Figure 10:
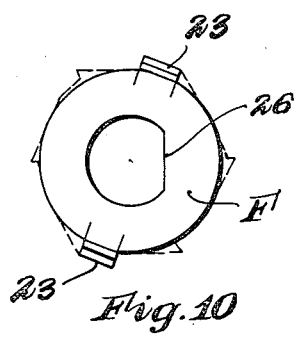
Figure 10 is a plan view of another form of my lock washer, showing a nut in dotted outline.

My nut lock washer may be operated with a nut C and with the nut lock washer of the formation such as D where the spring fingers 18 are formed as illustrated in Figure 8. In this construction the nut C is formed with notches 19 on the inner surface thereof which are adapted to receive the spring fingers 18 to lock the nut C in place against unthreading from the bolt 16. The bolt 16 is provided with a longitudinal recess 17 for receiving the lug 16.

Figure 6:
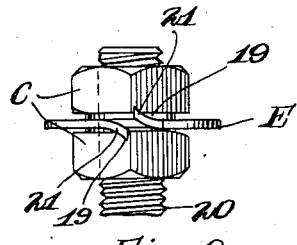
Figure 6 illustrates two nuts on a threaded bolt in locked position with the locking washer having spring fingers projecting in opposite directions from the faces thereof.
Figure 7:
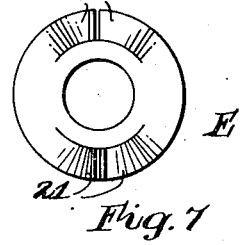
Figure 7 illustrates a plan view of the lock washer used in Figure 6.

When it is desired to use two nuts upon a bolt such as 20, illustrated in Figure 6, the nuts C may be employed and a nut lock washer such as E is used where the spring fingers 21 are formed to extend from the opposite faces of the washer E. In this formation, as illustrated in Figure 7, there are provided four spring fingers 21, the free ends of which are adjacent. When the nuts C are employed with the washer E it is not necessary that the bolt or threaded member 20 be formed with a longitudinal recess 17 nor the washer E formed with a lug to hold the same from turning. In this case, one of the nuts act as a fixed shoulder to hold the washer E from turning in operative position.

Figure 9:
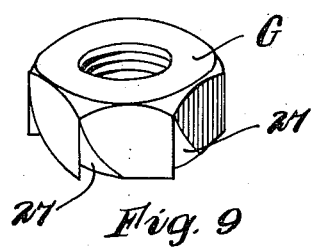
Figure 9 illustrates another form of the nut with notches on the outer sides adjacent the shoulders of the nut.
Figure 11:
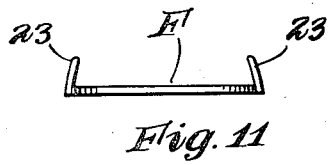
Figure 11 is a nut lock washer used in Figure 10 in side elevation.
Figure 12:
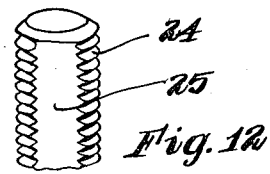
Figure 12 is a detail of the threaded member or bolt where one side of the same is flattened to provide a shoulder to hold the nut lock washer against turning.

My nut lock washer may be of the formation such as F, illustrated in Figure 11, having upwardly projecting spring fingers 23 which are formed from the body of the washer F and are made more flexible by slitting the washer F into the body thereof to provide the necessary spring to the fingers 23. In this form of the lock washer such as F, the threaded member or bolt 24 may be flattened on one side at 25 and the washer F formed with a flat complemental shoulder 26. This holds the washer F from turning. An ordinary nut may be used with the washer F, the spring fingers 23 engaging on the side walls of the same, or the nut such as G, may be used where notches 27 are formed at each corner as illustrated in Figure 9. When the nut G is used with the washer F, the spring fingers 23 will fit into the notches 27 and hold the nut G against unscrewing from the bolt 25.

Figure 13:
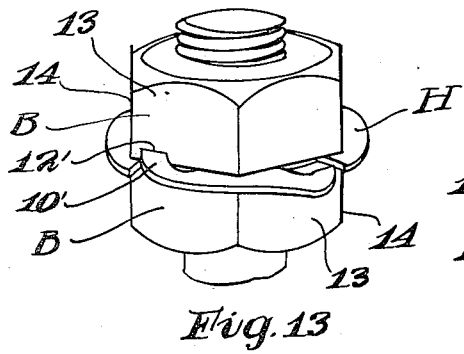
Figure 13 is an alternate construction of the form of Figure 6.
Figure 14:
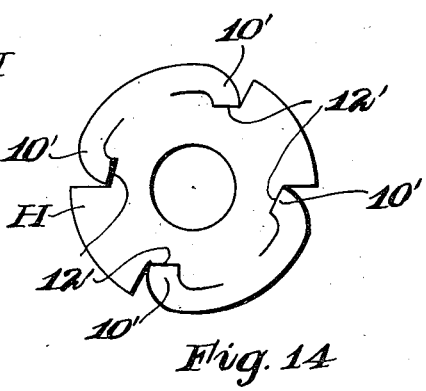
Figure 14 is a plan view of the washer of Figure 13.

My nut lock washer and the structure of the nut with shoulders formed therein provide a very simple inexpensive structure for locking a nut on a threaded bolt or shank and are adapted to positively hold the nut in the position in which it is set. This is an important feature because it provides a nut lock and washer means which provides a simple means of holding a nut in a set position, preventing the nut from becoming too tight or unthreading. Thus with my nut lock washer a nut may be set without a cotter key in the position in which it is set.

Where it is desired, my washer may be suited for engagement with two nuts B in the manner illustrated in Figure 13. The washer H is a combination of the forms of washers illustrated in Figures 2 and 7. The washer H is provided with spring fingers 10' having shoulder ends 12' to engage the side walls 13 of the nuts B adjacent the corners 14 of these nuts. Some of these spring fingers 10' extend upwardly from the surface of the washer H, to engage one nut B, and others extend downwardly to engage the other nut B. It is apparent that when one nut B is tightened to the desired position, the washer H inserted on the bolt, and a second nut B tightened over the washer H, the two nuts are positively held against movement by the spring fingers 10'.

My nut lock washer and nut structure provide a means of positively locking a nut on a threaded bolt so that the same cannot be removed without virtually destroying the washer in some forms of the structure illustrated. In this manner the nut lock washer forms a seal for holding a nut or nuts on a threaded shank positively locked and sealed thereto.

In accordance with the patent statutes I have set forth the different forms and constructions of my nut lock washer and nut means wherein a nut may be locked and sealed to a threaded member or be held in a set position, and I desire to have it understood that variations would be apparent to those skilled in the art within the scope of the following claims.

I claim:

1. A nut lock washer including, a spring arm having a shoulder end adapted to extend parallel with and to engage against a side of a nut to hold the same in a set position on a threaded member, and means formed in said washer to hold the same against turning with the threaded member.

2. The combination, a nut, a threaded bolt-like member, a longitudinal shoulder portion formed on said threaded member, a washer having a complemental shoulder adapted to engage with said longitudinal shoulder portion of said threaded member to hold the same against rotation, upwardly extending spring means formed in said washer engageable with the sides of said nut to provide a shoulder end, and recesses on the sides of the nut adapted to be engaged by said spring means of said washer.

3. The combination, a threaded member, a nut adapted to be secured thereto, a washer member, and means in said washer member and said nut adapted to provide means to lock said nut on said threaded member, said locking means including a shoulder portion formed on the sides of said nut, and spring finger means formed in said washer engageable with the sides of the nut adapted to engage said shoulder.

4. The combination, a threaded member, a nut to be locked on said threaded member, a washer, a shoulder in the opening of said washer, a shoulder formed along the threads of said threaded member, said shoulder of said washer and the shoulder of said threaded member being adapted to hold said washer against rotation, and spring fingers projecting upwardly from one side of said washer and ends on said fingers each bent to parallel one of the sides of a nut in locked position and engage said side to hold the nut in a set position and to permit the nut to be turned against the spring action of said fingers by force.

5. A nut lock washer including, a washer body, a spring arm having a substantially straight shoulder portion thereupon extending parallel with and adapted to engage against the side of a nut, and means formed in said body to hold the same against rotation upon a threaded member upon which said nut is threaded.

WILLIAM H. SCHMITT.